OPTICAL INSTRUMENTS

Filed Nov. 5, 1965 5 Sheets-Sheet 1

INVENTOR.
Morton Kaye
BY
Mattern, Ware & Davis
HIS ATTORNEYS.

INVENTOR.
Morton Kaye
BY
Mattern, Ware & Davis
HIS ATTORNEYS.

INVENTOR.
Morton Kaye
BY
Mattern, Ware & Davis
HIS ATTORNEYS.

INVENTOR.
Morton Kaye
BY
Mattern, Ware & Davis
HIS ATTORNEYS.

INVENTOR.
Morton Kaye
BY

Mattern, Ware & Davis
HIS ATTORNEYS.

United States Patent Office 3,544,220

Patented Dec. 1, 1970

3,544,220

OPTICAL INSTRUMENTS

Morton Kaye, Stamford, Conn., assignor, by mesne assignments, to The Plastic Contact Lens Company, Chicago, Ill., a corporation of Illinois Continuation-in-part of application Ser. No. 439,749, Mar. 15, 1965. This application Nov. 5, 1965, Ser. No. 506,521

Int. Cl. G01b *9/02;* A61b *3/10, 3/00*

U.S. Cl. 356—109 9 Claims

ABSTRACT OF THE DISCLOSURE

A method and apparatus are provided for investigating the nature of a curved surface particularly that of a contact lens. A first pattern of closely spaced lines is reflected off the curved surface and focused on an image plane. A second pattern of closely spaced lines is superimposed on the pattern located at the image plane. A moiré pattern is established which is utilized to indicate the character of the curved surface being investigated.

This application is a continuation-in-part of my earlier application, Ser. 439,749, filed Mar. 15, 1965, entitled "Optical Instruments." My earlier application is incorporated herein by reference.

The invention of this application relates to optical instruments. More particularly, it relates to a spherometer or other surface measuring instrument employing moiré pattern techniques.

In my earlier application, I disclosed methods for determining the radius of curvature of a curved surface and for using moiré techniques to produce a topographic map of the surface. These methods were especially adapted for producing a topographic map of the surface of the cornea of the human eye for the purpose of fitting contact lenses and for examining such contact lenses.

The method of determining the radium of curvature of a curved surface, disclosed in my previous application, requires the observer to observe two null positions. One where an interferometer, which preferably is of the moiré type, is focused to the surface to be measured and another where the interferometer is focused to the center of curvature of the surface to be measured. This requires taking two readings and adjusting the instrument between readings.

It would be desirable if one could determine the radius of curvature of a curved surface simply by a single reading, preferably by some sort of null technique.

Such an instrument would not only be applicable to the measurement of the radius of curvature of the cornea of a patient but would be a great improvement over present instruments for examining contact lenses made according to prior art techniques.

Contact lenses are now made to fit the cornea. To do this, the inner surface of the lens is ground to a spherical surface of small radius at the central portion thereof. This is known as the base curve. Surrounding the central portion or base curve is a larger annular portion ground to a second, larger, radius of curvature called the secondary curve. In some cases there may be more than one secondary curve. As the lens must not have any sharp edges, portions of the lens where the various curves meet must be ground down to "blend" the curves. These are known as the blend or transition zones. Further complicating the manufacture of contact lenses is the fact that most corneas are astigmatic; that is, the radius of curvature of the surface, of both the base curve and the secondary curve, will differ along mutually perpendicularly axis. This difference is called cylinder.

During the manufacture of contact lenses, because they are made of a relatively soft plastic, they may become warped, in which case they should not be used. Normally, the outer surface of the contact lens is ground to a single radius of curvature. The difference between the outer radius of curvature and the base curve defines the power of the lens, that is, its transmission magnification characteristic.

After a contact lens has been made and during the manufacturing process, the base curve, secondary curve, transition zones, cylinder wrap, power, and outer surface radius of curvature must be measured. The lenses are made in a series of successive approximations, more closely attaining the curves desired. Instruments now used for measuring contact lenses are very inefficient and inaccurate. They only tell the radius of the curve that would according to certain assumptions join two points being measured on the lens. These points may not, in fact, be joined by such a curved surface. Thus, it is highly desirable that an instrument be provided for measuring contact lenses that will give information about the entire topography of a lens and the various curves forming the lens.

The present invention provides such an instrument employing moiré techniques of the type generally disclosed in my earlier application.

It is, therefore, an object of the present invention to provide methods and apparatus for measuring the curvature of a reflecting surface.

Another object of the invention is to provide methods and apparatus of the above character for measuring the radius of curvature of an approximately spherical surface at any place on the surface.

Still another object of the invention is to provide methods and apparatus of the above character for measuring the radius of curvature at any point on the cornea of the eye.

Yet another object of the invention is to provide methods and apparatus of the above character for measuring the radius of curvature at any point on a contact lens.

Another object of the invention is to provide methods of the above character requiring the operator to take but a single reading after recognizing the establishment of a single null.

Still another object of the invention is to provide methods and apparatus of the above character for measuring the base curve, secondary curves, transition zones on both surfaces of a contact lens, the cylinder warp and power of the lens, the size of the lens and the various curves and zones thereof.

A further object of the invention is to provide methods of the above character using moiré techniques.

A still further object of the invention is to provide methods and apparatus of the above character for obtaining a topographic map of a curved surface.

A yet further object of the invention is to provide methods and apparatus of the above character of obtaining a topographic map of the cornea of the eye.

Still yet a further object of the invention is to provide methods and apparatus of the above character for obtaining a topographic map of a contact lens.

Another object of the invention is to provide methods and apparatus of the above character for obtaining a topographic map using moiré techniques.

Still another object of the invention is to provide methods and apparatus of the above character for the improved fitting of contact lenses.

Yet another object of the invention is to provide methods and apparatus for measuring any changes in the corneal surface caused by the wearing of contact lenses.

A further object of the invention is to provide methods and apparatus of the above character which are comparatively simple, easy to use, and inexpensive.

A still further object of the invention is to provide methods and apparatus of the above character employing incoherent light.

Other objects of the invention will in part be obvious and will in part appear hereinafter.

The invention accordingly comprises several steps and the relation of one or more of such steps with respect to each of the others, and apparatus embodying features of constructions, combinations of elements and arrangements of parts which are adapted to effect such steps, all as exemplified in the following detailed disclosure. The scope of the invention will be indicated in the claims.

For a fuller understanding of the nature and objects of the invention, reference should be had to the following detailed description taken in connection with the accompanying drawings, in which.

The same reference characters refer to the same elements throughout the several views of the drawings.

GENERAL DESCRIPTION

Figures 1, 7:
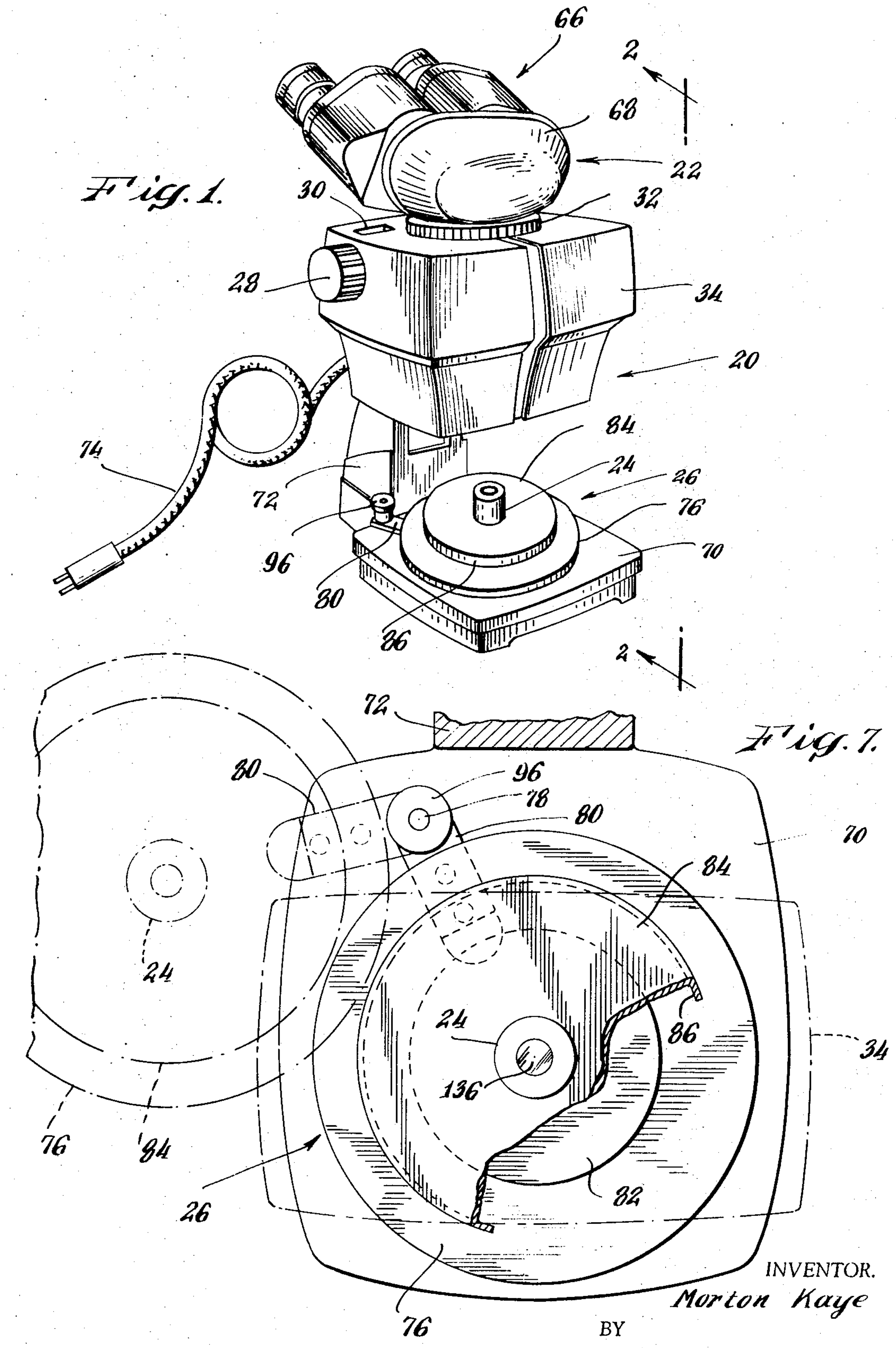
FIG. 1 is a perspective view of a spherometer, according to the present invention.
FIG. 7 is a top view partially cut away of the base of the spherometer of FIG. 1.

Now referring to FIG. 1 of the drawings, the spherometer 20 of the present invention generally comprises a conventional zoom microscope 22 modified in accordance with the present invention for the measurement of contact lenses.

The modifications take the form of a lens holder 24 and movable support therefor, generally indicated at 26; and knob 28 controlling a counter (viewable through window 30), and the zoom control knob of the microscope 32 so that the amount of magnification provided by the microscope is indicated by the counter.

Figure 11:
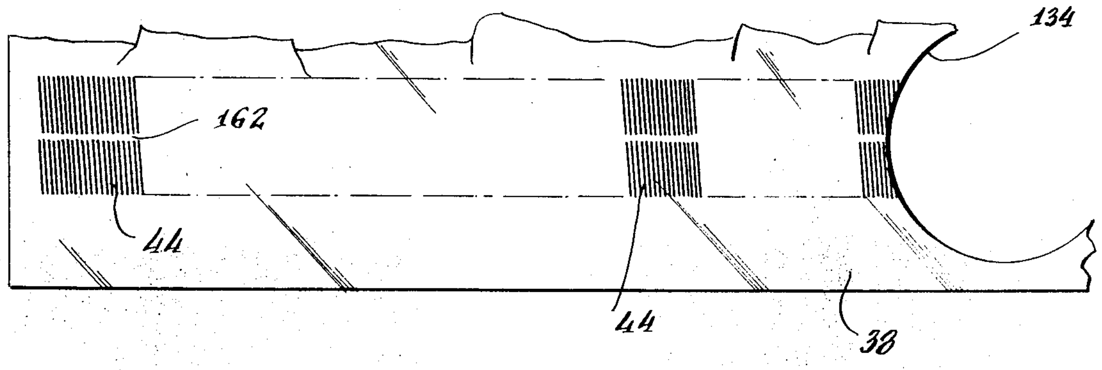
FIG. 11 is a top view, partially cut away, of a large pattern projected on a lens being measured.

Within housing 34 provided by the invention are mounted a plurality of lamps 36 for projecting a pattern 38 (FIGS. 2 and 11) on a lens mounted in the lens holder 24. Pattern 38 is mounted on a narrow cylindrical surface having its axis in the object plane of the microscope 22 because such a surface will be imaged on a plane by the spherical surface to be examined.

Figure 12:
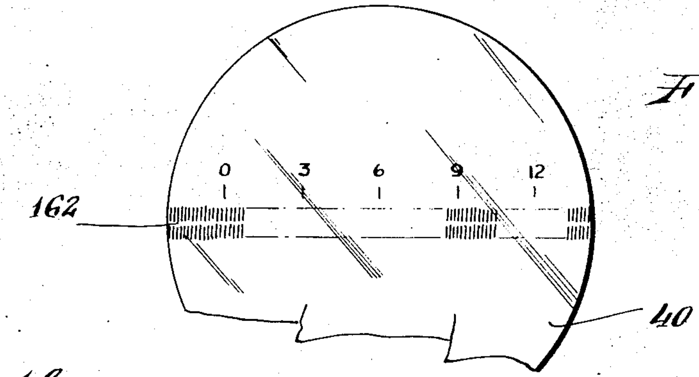
FIG. 12 is an enlarged view of a reticle located at a focal plane of one eyepiece of the spherometer of FIG. 1.
Figure 13:
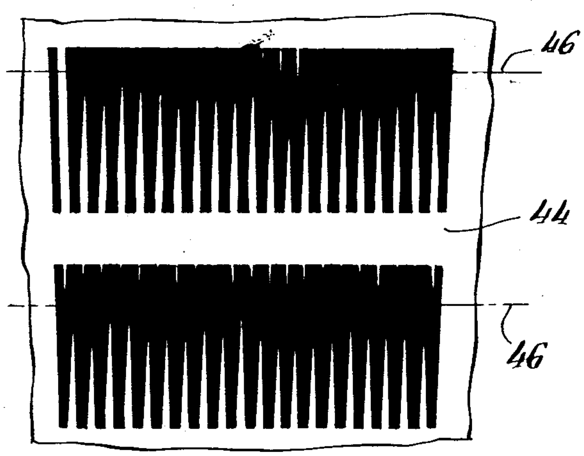
FIG. 13 is an enlarged fragmentary schematic view illustrating the horizontal moiré fringe pattern observed when the spherometer of FIG. 1 has been adjusted to a null.
Figure 14:
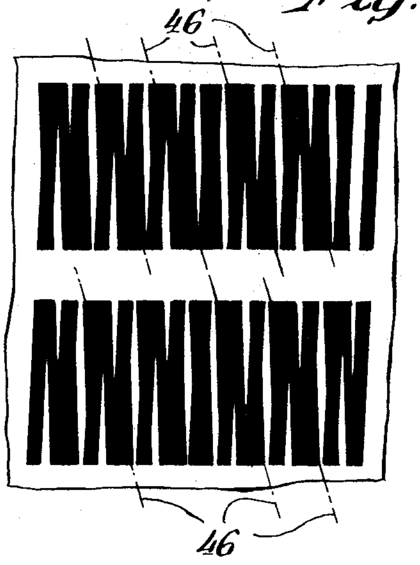
FIG. 14 is an enlarged fragmentary schematic view illustrating the diagonal fringe pattern observed when the instrument is not adjusted to a null; and, FIG. 15 is an enlarged fragmentary schematic view of what may be seen in the eyepiece when a contact lens is being examined and the radius of curvature of the base curve thereof is ready to be measured.

A second pattern or reticle 40, (FIG. 12) is located within the left eyepiece 42 at an image plane of the microscope 22.

Now referring to FIGS. 11 through 15, the pattern 38 has a plurality of slanted straight lines 44 thereon and the corresponding portion of the reticle 40 has the same pattern of straight lines 44 at the opposite angle. The two patterns are preferably made from the same master, one being the mirror image of the other. It is preferable for high contrast, but not required, that the lines 44 be the same width as the spaces between them.

When an object having a spherical surface is located in the lens holder 24, the pattern 38 will be reflected therefrom back to the microscope to a focal plane within the eyepiece 42 where the reticle 40 is located. If the mircroscope is then adjusted by adjusting knob 28 to control the zoom mechanism until the reflected image of the lines 44 of the pattern 38 are of the same size and have the same separation as the lines 44 of the recticle 40, the crossed lines 44 will form a moiré pattern of horizontal straight fringed lines, as schematically shown at lines 46 in FIG. 13. If the zoom mechanism is adjusted so that the two images are not of the same size, the fringe lines will be skewed as indicated schematically at lines 46 in FIG. 14.

Figure 15:
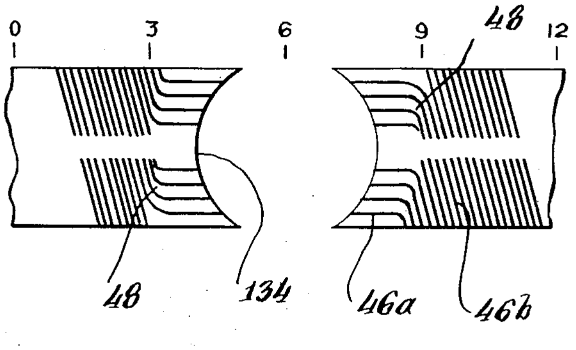

When a contact lens is inserted in lens holder 24, a pattern such as that shown in FIG. 15 will be seen in the eyepiece 42. In FIG. 15 the zoom mechanism has been adjusted such that the fringe lines **46*a* are horizontal over the central zone of the lens. The operator of the instrument may then read from the counter, the radius of curvature of the base curve. He may then adjust the zoom mechanism to bring the fringe lines 46*b* to be horizontal in which case the lines 46*a* over the base curve will become skewed. The dial will then indicate the secondary curve. The curvature of the fringe lines at the blend 48 indicates that the blend is an aspherical surface. In a good lens the lines should be smooth curves as shown at 48. In a poor lens, having a sharp edge, the fringe lines 46 would form sharp angles at the blend 48** or in an extreme case might appear discontinuous.

If the contact lens has cylinder, the amount of cylinder may be measured. For example, if the base curve has cylinder, the lens may be placed in the holder and the fringe lines **46*a* along the base curve brought to horizontal as shown in FIG. 15. The reading of the dial is then taken. Then the lens is rotated 90°. If there is cylinder, the lines 46*a* over the centrol portion or the base curve of the lens will no longer be horizontal. The knob 28** is turned to adjust the zoom mechanism until the lines are again horizontal and the reading taken. The difference in the reading is the cylinder over the central portion of the lens.

Similarly the transmission power of the lens may be measured by placing a spherical mirror 136 (FIG. 3) behind the lens so that the pattern 38 is projected through the lens on to the mirror 136 and back through the microscope system. Thus, the transmission characteristic of the lens must be compensated for by the zoom mechanism in order to make the fringe pattern 46 horizontal. The difference in compensation from that required when no lens is present in the mirror holder is the transmission power of the lens.

Figures 4, 5:
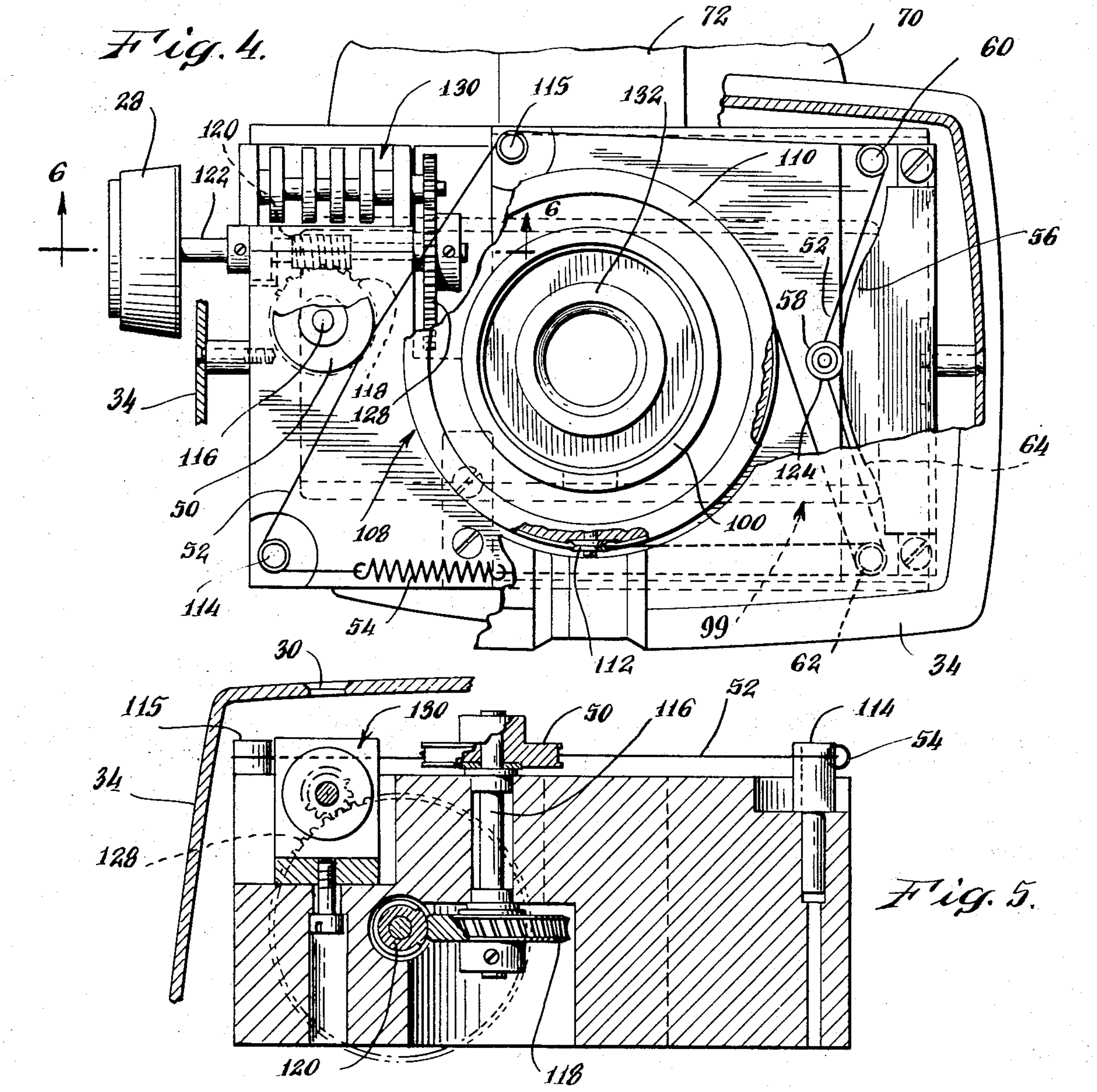
FIG. 4 is a top view, partially in cross section, the cross section being taken along the line 4—4 of FIG. 3 with the optical system removed.
FIG. 5 is a fragmentary cross section taken along the line 5—5 of FIG. 2.

Because the zoom mechanism of the microscope 22 is non-linear, that is the amount of change of magnification is not constant for the same angular motion of the zoom control knob 32 (FIGS. 1 and 4), the invention provides a compensating transmission between a drive pulley 50, driven by the control knob 28 and the zoom control knob 32 of the microscope 22. This takes the form of an inextensible wire or cord 52 connected in driving relation between the pulley 50 and the knob 32 best seen in FIG. 4. In FIG. 4 the microscope 22 has been removed. A spring 54 connects the ends of the wire 52.

A cam follower 58 connected to the cord 52 rides on a compensating cam 56. Because more cord 52 must be brought between the pulleys 60 and 62 when the cam follower 58 is at the high position on the cam 56 shown then when it is at a low position, for example at position 64, the movement of the control knob 32 will be greater for the same angular motion of the pulley 50 at the high position 58 than at the low position 64. In this way the amount of change of magnification provided by angular motion of the pulley 50 is made constant.

SPECIFIC DESCRIPTION

Figures 2, 9, 10:
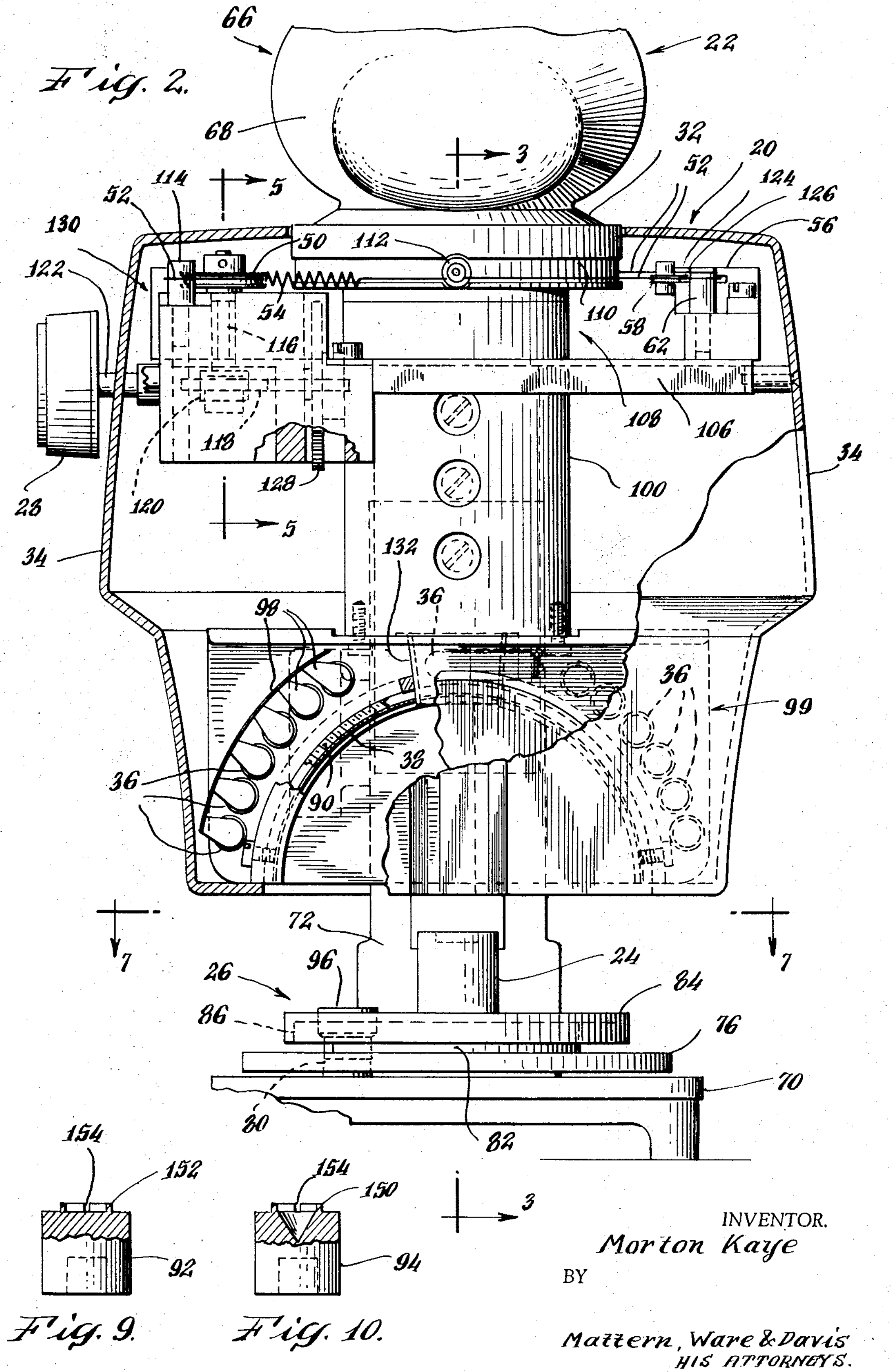
FIG. 2 is an enlarged front view, partially in cross section, the cross section being taken along the line 2—2 of FIG. 1.
FIG. 9 is a side view, partially cut away, of a lens holder.
FIG. 10 is a side view, partially cut away of a lens holder.
Figures 3, 8:
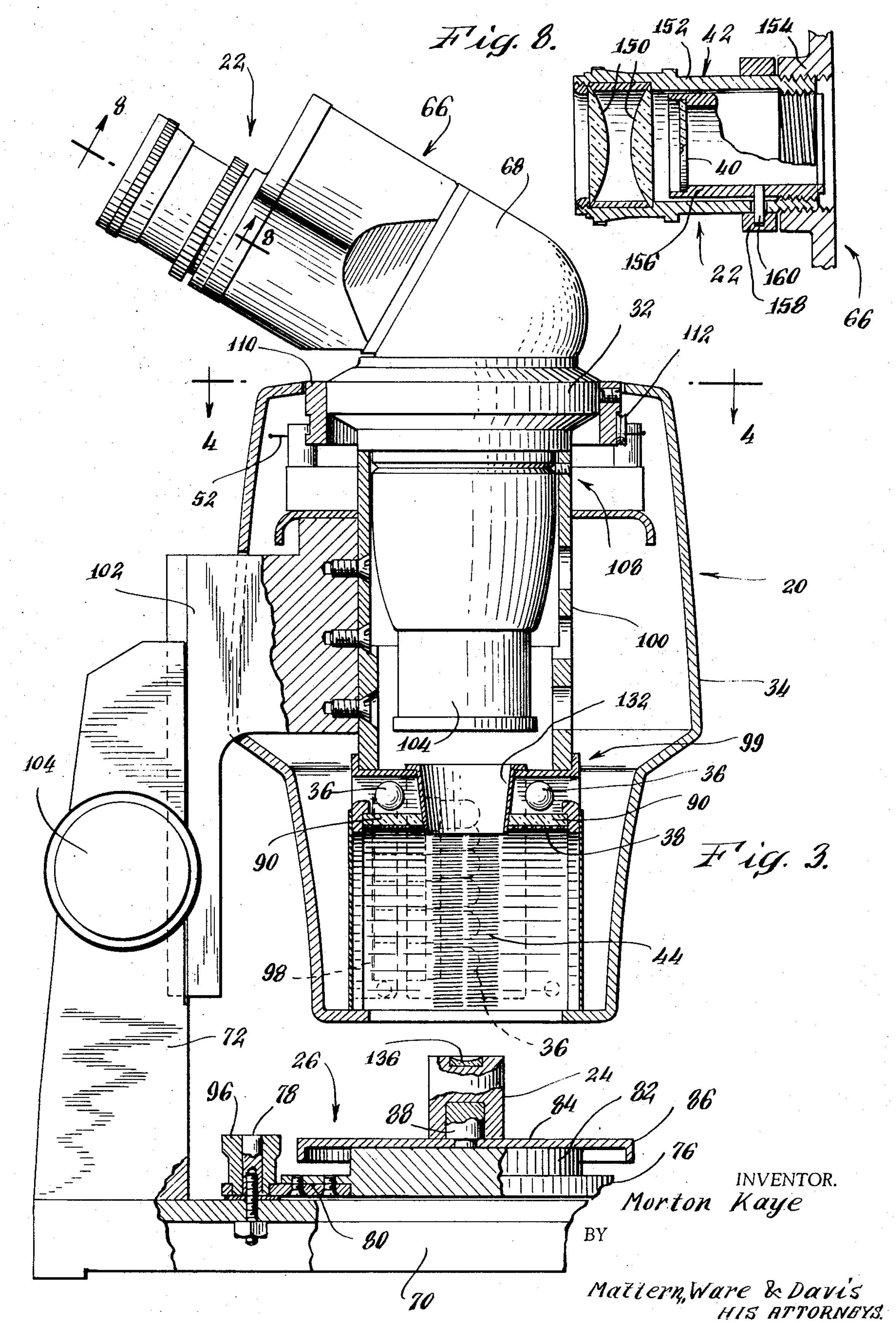
FIG. 3 is a side view, patrially in cross section, the cross section being taken along the line 3—3 of FIG. 2.
FIG. 8 is a fragmentary cross section taken along the line 8—8 of FIG. 3.

More particularly and referring to FIG. 1, the microscope 22 compirses a binocular, generally indicated at 66, prism housing 68, base 70, and pedestal 72. A line cord 74 is provided for a connection to a source of power suitable for the lamps 36 (FIG. 2). A base plate 76 is adjustably mounted on the pedestal 70 at screw 78 (FIG. 7) by means of arm 80. An upstanding plate 82 is mounted on base plate 76. Referring to FIG. 3, movable plate 84, having a depending angular flange 86, is loosely mounted thereon and held thereto by thick grease. An upstanding pin 88 is mounted to movable plate 86 for conveniently holding interchangeable lens holders 24 (FIG. 3), 92 (FIG. 9), and 94 (FIG. 10).

Again referring to FIGS. 1 and 7, the base plate assembly 26 may be rotated out of the way of the housing 34 as shown in dotted lines in FIG. 7, the appropriate lens holder placed thereon and it may again be rotated back under the housing 34 and thumb nut 96 may be tightened to hold the assembly in place. The lens holder 24 may then be adjustably moved within the field of view by hand movement of movable plate 84 under the loose constraint of the grease between plate 84 and plate 82.

Now referring to FIG. 2, within the housing 34 is mounted the pattern 38 on a cylindrical surface whose axis intersects the objective plane of the microscope 22. A piece of white translucent plastic 90 is located behind the pattern 38 and behind this are located the plurality of lamps 36 which are connected together in circuit to the line cord 72 by means of contacts and wires 98. All of the above are supported in a generally cylindrical holder 99.

Both housing 34 and holder 99 are mounted to a cylindrical support 100. This is mounted to the pedestal 72 by means of a support arm 102 (FIG. 3) mounted by means of a rack and pinion (not shown) to the pedestal 72 under control of focusing knob 104. The microscope is held within the support 100 and the objective thereof 104 may be seen in FIG. 3.

Still referring to FIG. 3, a flanged plate 106 is mounted to support arm 102 and supports the zoom mechanism generally indicated at 108 in FIG. 2. The zoom control knob 32 of the microscope 22 has mounted thereon a zoom control ring 110.

Now referring to FIG. 4, the wire 52 or cord is fixed to the periphery of zoom control ring 110 by means of a screw and washer 112. The wire 52 is wrapped 360° about pulley 50. It passes approximately 170° around pulley 114 to the spring 54. From the spring 54 it passes approximately 190° around pulley 62 to zoom control ring 110. It is wrapped approximately 270° about zoom control knob 110, then approximately 180° about pulley 62 which may be formed with two wheels (not shown). The wire 52 then connects to cam follower 58, passes around pulley 60, then around pulley 115 and back to drive pulley 50.

Thus the spring 54 is located on one side of the drive between pulley 50 and zoom control ring 110 and the cam 56 is located on the other. Note that left and right motion of the cam follower 58, as seen in FIG. 4, would rotate zoom control ring 110 independently of drive pulley 50. By appropriately choosing the shape of cam 56, the dial reading of counter 130 may be made linear with the magnification of the zoom mechanism 108.

Referring to FIG. 2, it may be seen that cam follower 58 is kept engaged with the cam 56 by means of an annular flange 124 on the cam follower 58 fitting into a peripheral slot 126 on the cam 56.

Still referring to FIG. 2, drive pulley 50 is mounted to shaft 116. A gear 118 is mounted to the other end of shaft 116.

Figure 6:
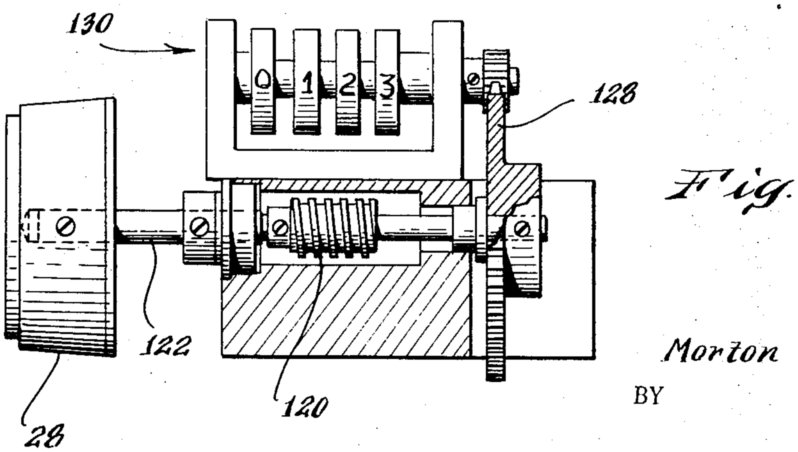
FIG. 6 is a fragmentary cross section taken along the line 6—6 of FIG. 4.

Now referring to FIG. 5, gear 118 is driven by worm gear 120. Now referring to FIG. 6, worm gear 120 is mounted on shaft 122 driven by the control knob 28. Thus rotation of the zoom control knob 28 drives the zoom control 32 provided by the microscope 20. And, as previously described, non-linearities in the change in magnification of the microscope are compensated for by means of the cam 56 and cam follower 58.

A gear 128 is mounted to the shaft 122 controlled by the control knob 28. This drives a digital counter, generally indicated at 130, of conventional design. Thus, adjustment of control knob 28 changes the reading of the digital counter 130. Digital counter 130 may be viewed through viewing window 30 provided in the housing 34 (FIGS. 1 and 5).

Now referring to FIG. 3, it will be seen that a cone 132 is provided so that light from the lens under observation may pass into the objective 104. This necessitates a hole 134 in the pattern 38 which can be seen in FIG. 15 as a circular area having no fringe lines 46.

Three lens holders are normally provided with the instrument. Lens holder 24 has a spherically concave mirror 136 mounted therein. Since the curvature of mirror 136 is known, the spherometer 20 may be calibrated by placing lens holder 24 on pin 88, as shown in FIG. 3, and adjusting the instrument to provide a horizontal fringe pattern. The counter 130 of the instrument will then read a number which is the reference number of the instrument from which all other measurements are calibrated. Lens holder 24 is further used in measuring a lens in transmission by placing the lens in the holder whereby the pattern 38 is projected through the lens onto the concave mirror back through the optical system for comparison at the reticle in the eyepiece.

The lens holder 94 of FIG. 10 is used for measuring the concave surface of a lens. Lens holder 94 has a concave recess 150 therein which is painted or otherwise surfaced black. A drop of water is put in the recess 150 and the lens dropped into it, concave side up. The water prevents any reflection off the back surface of the lens. Only the front surface exposed to the air reflects the pattern 38.

Lens holder 92 is adapted for measuring the convex surface of a contact lens. A drop of water is placed in the blackened recess 152 and the lens dropped into the recess, concave side down. The only reflecting surface visible in the microscope objective is the outer convex surface of the lens. Lens holder 92 and 94 are provided with at least one slot 154 so that a small tool may be inserted therein to lift a lens out of the holders after measurement.

Referring to FIG. 8, reticle 40 is mounted in left eyepiece 22. Lenses 150 are mounted in tube 152. Tube 152 may be rotated in and out of support 154 to accommodate the user's eye. Since the entire left ocular 66 may be rotated about an axis offset from eyepiece 150 to accommodate the user's inter pupillary distance, means are provided for aligning reticle 40. Reticle 40 is mounted in tube 156 threaded in tube 152. These threads are very fine so that the reticle 40 may be rotated a few degrees without moving it out of the image plane. This is accomplished by rotating knurled ring 158 connected by pin 160 to tube 156. The user turns ring 158 until the lines 162 of the pattern 38 and reticle 40 are aligned.

It will thus be seen that by my invention I have provided means for reflecting a first pattern from a curved surface to be measured through variable magnification means focusing said first pattern onto a second related pattern to produce a moiré fringe null pattern when the first pattern and the second pattern bear a predetermined size relationship, whereby the curvature of reflecting surface may be measured. Although the instrument specifically described herein is adapted to examine contact lenses, other surfaces may be examined by my techniques, specifically corneas, in accordance with the principals of my above-identified co-pending application. I have also provided a curved mirror of given magnification onto which a lens may be placed so that the first pattern may be projected through the lens, be reflected by the mirror through a variable magnification instrument, and focused on a reticle having a comparison pattern, whereby the transmission characteristics of the lens may be determined.

I have further provided transmission means between two rotatable shafts whereby the transmission ratio between the two shafts may be infinitely varied in accordance with a predetermined functional relationship. I do this by providing an inextensible cord about a drive shaft and about a driven shaft, said cord being connected between said two shafts on one side by a spring and said shafts on the other side being connected by the cord passing by transverse displacement means of predetermined shape.

It will thus be seen that the objects set forth above, among those made apparent from the preceding description, are efficiently attained and, since certain changes may be made in carrying out the above methods and in the constructions set forth without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. The method of examining an object having a curved surface by means of moiré fringe formation comprising the steps of:

(A) reflecting a first pattern of closely spaced lines from a surface;

(B) focusing the reflected image of said first pattern on an image plane;

(C) providing a second pattern of closely spaced lines at said image plane that produces a unique moiré fringe null pattern when said patterns are superimposed and have a predetermined size relationship at said image plane;

(D) varying relative the size of one of said patterns in said superimposed relationship to establish said moiré fringe null pattern over a portion of the image of said surface; and (E) observing the nature of the established moiré pattern indicative of the character of the curved surface.

2. The method defined in claim 1 wherein said first and second patterns are a plurality of straight parallel lines.

3. The method defined in claim 2 wherein said second pattern is the mirror image of said first pattern.

4. An optical instrument for examining a curved surface comprising, in combination:

(A) support means for holding said surface;

(B) means for projecting a first pattern of closely spaced lines on a surface to be examined;

(C) variable magnification means for focusing on an image plane a variable size image of said first pattern;

(D) a second pattern of closely spaced lines (a) located at said image plane of said variable magnification means (b) said second pattern and the image of said first pattern producing a unique moiré pattern when the image of said first pattern is of a predetermined size; and (E) means for observing said moiré pattern and means to indicate the character of the curved surface from said pattern.

5. The optical instrument defined in claim 4, and:

(F) the indicating means includes readout means drivingly connected to said variable magnification means.

6. The optical instrument defined in claim 4, and:

(F) the indicator means includes a counter drivingly connected to said variable magnification means.

7. The optical instrument defined in claim 4, and:

(F) the indicator means includes readout means; and, (G) nonlinear transmission means (a) drivingly connected between said variable magnification means and said readout means.

8. The optical instrument defined in claim 4 wherein said projecting means comprises:

(a) a cylindrical pattern bearing surface (1) the axis of said surface being coincident with the object plane of said variable magnification means.

9. The optical instrument defined in claim 4 wherein said patterns are formed of a plurality of straight parallel lines.

References Cited

UNITED STATES PATENTS

| | | | |
|---|---|---|---|
| 1,590,532 | 6/1926 | Lenouvel | 88—14 |
| 3,175,093 | 3/1965 | De Lang | 88—14 UX |
| 3,264,932 | 8/1966 | Hendricks | 88—14 UX |

FOREIGN PATENTS

| | | |
|---|---|---|
| 144,999 | 4/1960 | Russia. |
| 155,964 | 1/1962 | Russia. |

OTHER REFERENCES

Zimmerman, J., "A Method for Measuring the Distortion of Photographic Objectives," Applied Optics, vol. 2, No. 7, July 1963, pp. 759–760.

Burch, J., "The Possibilities of Moiré Fringe Interferometry," National Physical Laboratory Symposium No. 11, London: Her Majesty's Stationary Office, 1960, p. 193 relied on, complete article pp. 180–222.

Smith, F. Dow, "Contour Measurements with a Moiré Fring Interferometer," abstract from The Journal of the Optical Society of America, vol. 47, No. 1, January 1957, p. 120.

RONALD L. WIBERT, Primary Examiner

T. MAJOR, Assistant Examiner

U.S. Cl. X.R.

351—13, 40